June 1, 1943. J. G. WALZ 2,320,900
BIMETALLIC CLUTCH
Filed Aug. 13, 1940

WITNESSES:
E. A. McCloskey
A. L. Jeffrey

INVENTOR
John G. Walz.
BY
Paul E. Friedemann
ATTORNEY

Patented June 1, 1943

2,320,900

UNITED STATES PATENT OFFICE 2,320,900

BIMETALLIC CLUTCH

John G. Walz, Holyoke, Mass., assignor to Westinghouse Electric & Manufacturing Company, East Pittsburgh, Pa., a corporation of Pennsylvania Application August 13, 1940, Serial No. 352,417

9 Claims. (Cl. 192—82)

My invention relates to clutches and more particularly to thermally actuated clutches.

An object of my invention is to provide a clutch which shall be positive in action yet inexpensive and simple to manufacture.

Another object of my invention is to provide a clutch which shall be entirely automatic in operation.

A further object of my invention is to provide a clutch which shall have a snap action engagement and snap action disengagement.

A still further object of my invention is to provide a clutch which shall operate to engaged position with a snap action at one temperature and to a disengaged position with a snap action at another temperature.

According to my invention, I provide an automatic clutch mechanism having for its main operating element a thermal responsive device such as a bar type or disk type bimetallic thermostat of the snap action type.

My invention is applicable to any type of apparatus utilizing a clutch mechanism, the practicability of the use of my novel clutch mechanism being only a matter of design and dimensional proportions for the various types of apparatus.

The novel features which I consider characteristic of my invention are set forth with particularity in the appended claims. The invention itself, however, both as to its organization and its method of operation, together with additional objects and advantages thereof, will be best understood from the following description of specific embodiments, when read in connection with the accompanying drawing, in which, Figure 1 is an elevational view, partly in section, of one embodiment of my invention showing a disk type clutch supported by two bearings, wherein one member of the clutch comprises a disk type bimetallic element;

Figure 1:
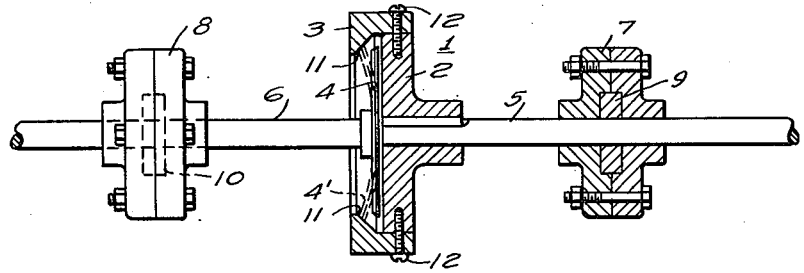

Referring particularly to Figure 1 of the drawing, there is shown one modification of my novel clutch mechanism comprising a bi-element clutch structure 1 having a base member 2, a sleeve portion 3 and a bimetallic member 4. For the particular application shown, this bimetallic member 4 is of the snap-acting type. The base member 2 is secured to a shaft 5 by press fit or otherwise and the bimetallic element 4 is secured to a shaft 6, in a like manner. The shafts 5 and 6 are supported by the bearings 7 and 8, respectively. Secured to the shafts 5 and 6 are collars 9 and 10 disposed within the bearings 7 and 8. The purpose of these collars is to limit the longitudinal movement of the shafts 5 and 6. The sleeve member 3 comprises an annular ring having an undercut portion 11 and is secured to the base member 2 by machine screws 12. The undercut portion 11 of the ring 3 provides an engaging surface for the bimetallic snap-acting element 4, when it is flexed towards the portion 11, by changes in temperature.

In the operation of a clutch of this type, the bimetallic element 4 may be so constructed as to flex within certain predetermined temperature limits. The bimetallic element 4 is shown in the disengaged position in full lines and in the engaged position in dotted lines, as indicated by reference character 4'. When the temperature of the medium surrounding the clutch 1 changes to such an extent as to cause the bimetallic element 4 to flex with a snap action in a direction towards the undercut portion 11 of the annular ring 3, the bimetallic element 4 will positively and firmly engage the annular ring 3, at 11, and thereby cause the shaft 6 to be rotated, if the shaft 5 is rotating.

The selection of the thermostatic disk or member 4 is such that it moves to an arcuate position with a snap action upon a predetermined high temperature and then again returns with a snap action upon a predetermined lower temperature. One of the important advantages of my snap-acting type of thermostatic elements is that the clutch provides for positive engagement for one temperature and for positive, or complete, disengagement for another temperature. There is thus no gradual engagement with the consequent slippage and thus wear of the parts.

Figure 2:
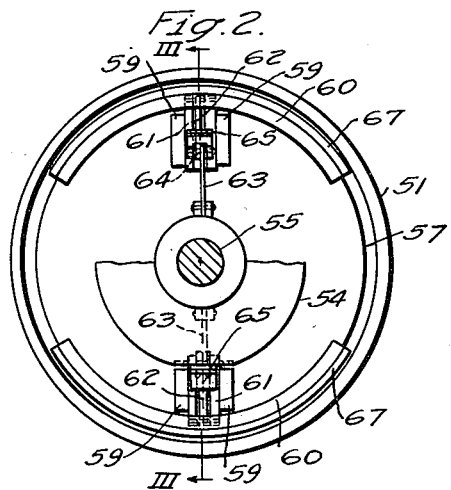
Fig. 2 is an elevational view of a modification of my invention showing a cup type clutch, one member of which comprises a plurality of arcuate engaging members actuated by a linkage mechanism disposed between the engaging members and bimetallic elements.
Figure 3:
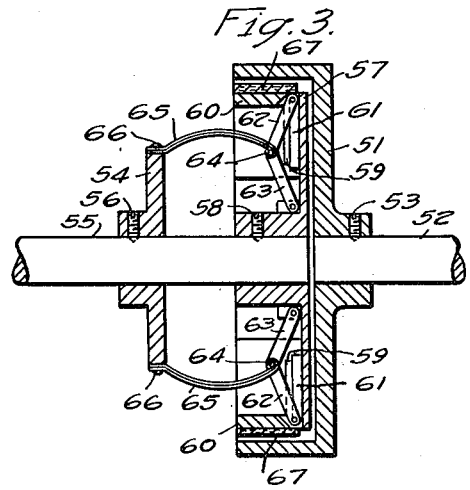
Fig. 3 is a sectional view of the clutch shown in Fig. 2 taken along the line III—III thereof.

The clutch mechanism illustrated in Figs. 2 and 3 comprises a cup-shaped member 51 secured to a shaft 52 by a set screw 53. A supporting flange 54 is secured to a shaft 55 by a set screw 56. A flange 57 is also secured to the shaft 55 by a set screw 58. Guide members 59 are welded to or otherwise secured to the flange 57. Arcuate clutch engaging members 60 having angularly disposed slide members 61 slidably mounted between the guide members 59, are adapted to engage the member 51. Links 62 and 63 forming a toggle mechanism are pivotally connected together at 64. The other ends of the links 62 are pivotally connected to the arcuate clutch engaging members 60. The other ends of the links 63 are pivotally connected to the hub portion of the flange 57. Snap-acting bimetallic elements 65 are supported at one end of the supporting flange 54 by screws 66. The other ends of the bimetallic elements are pivotally secured to the links 62 and 63 at 64. The arcuate members 60 are provided with a clutch engaging surface 67 of a material such as rubber or any fibrous material, to provide a gripping action between the member 51 and the clutch engaging members 60.

When the temperature of the medium surrounding the clutch mechanism is subjected to changes so as to actuate the bimetallic elements 65, for example, if the temperature rises, the bimetallic elements will tend to straighten out and exert a force against the links 62 and 63 and due to the toggle effect of the links 62 and 63 will thereby actuate the arcuate clutch engaging members 60 in a radial direction into engagement with the other member of the clutch 51. When the temperature of the medium surrounding the clutch decreases, the bimetallic elements 65 will return to their normal or arched position, thereby releasing the pressure of the links 62 and 63 on the arcuate clutch engaging members 60 and thereby disengaging the clutch engaging members 60 from the member 51.

It is obvious that the operation of a clutch mechanism according to my invention may be effected by either a rise or a decrease in temperature to cause either engagement or disengagement of the clutch members. For example, the bimetallic elements could be designed and adjusted so as to cause engagement of the members by a rise in temperature or a decrease in temperature, or to cause disengagement of the members by a rise in temperature or a decrease in temperature.

Although I have shown and described certain specific embodiments of my invention, I am fully aware that many modifications thereof are possible. My invention, therefore, is not to be restricted except insofar as is necessitated by the prior art and the spirit of the appended claims.

I claim as my invention:

1. In combination, a clutch comprising a driving member and a driven member, at least one of said members including a bimetallic thermal responsive element of the snap-acting type, the other of said members comprising a substantially cup-shaped element, including a portion for engaging the thermal responsive element.

2. In combination, a clutch comprising a driving member and a driven member, at least one of said members including a bimetallic thermal responsive element of the snap-acting type, the other of said members comprising a substantially cup-shaped element, having a base portion and a cooperating sleeve portion, said base portion and said sleeve portion providing a clutch engaging chamber for the thermal responsive element.

3. In combination, a clutch comprising a driving member and a driven member, at least one of said members including a bimetallic thermal responsive disc-shaped element of the snap-acting type, the other of said members comprising a substantially cup-shaped element, having a base portion and a cooperating sleeve portion, said base portion and said sleeve portion providing a clutch engaging chamber for the thermal responsive element.

4. In combination, a clutching device having two mechanisms, one of which comprises a cup-shaped element secured to a shaft, the other of which comprises a flange element secured to another shaft, including snap-acting bimetallic thermal responsive elements mounted on said flange, said flange and said thermal responsive elements being disposed within the cup-shaped element, said thermal responsive elements adapted to engage and disengage the cup-shaped element upon a change in temperature.

5. In combination, a clutching device having two mechanisms, one of which comprises a substantially cup-shaped element secured to a shaft, the other of which comprises a substantially cup-shaped element disposed within the first cup-shaped element, including a base member secured to another shaft, arcuate members slidably mounted on said base member, linkage mechanisms pivotally secured to said base member and said arcuate members, a supporting flange secured to the latter shaft, and snap-acting bimetallic thermal responsive elements secured to the supporting flange and pivotally secured to the linkage mechanisms, said thermal responsive elements and said linkage mechanisms cooperating with said arcuate members to cause by virtue of the snap-acting feature of the bimetallic thermal responsive elements a rapid engagement and disengagement of said arcuate members with the first cup-shaped element, upon a selected change in temperature.

6. In combination, a pair of shafts having ends disposed adjacent each other, one of said shafts being a driving shaft and the other being a driven shaft, a clutching device having one mechanism, comprising a driving mechanism, secured to the end of said driving shaft, and a second mechanism, comprising a driven mechanism, secured to the adjacent end of the driven driven shaft, one of the said mechanisms including a snap-acting bimetallic thermal responsive element adapted to actuate the said one mechanism to cause positive and rapid engagement between said driving and driven mechanisms at one temperature and to cause complete and rapid disengagement between the said driving and driven mechanisms at another temperature.

7. In combination, a clutching device having a driving mechanism and a driven mechanism, at least one of said mechanisms having as part of its elements a snap-acting bimetallic thermal responsive element cooperating with the other mechanism to cause engagement between the driving and driven mechanisms at one temperature and to cause disengagement of the driving and driven mechanisms at another temperature.

8. In combination, a pair of substantially aligned shafts having ends disposed adjacent each other, a clutching device having two mechanisms, one of said mechanisms comprising a substantially cup-shaped element secured to the end of one shaft, the other of said mechanisms comprising a substantially cup-shaped element disposed within the first cup-shaped element, and including a base member secured to the adjacent end of the other shaft, arcuate members slidably mounted on said base member, and snap-acting bimetallic thermal responsive elements disposed to actuate, with a snap action, the arcuate members into engagement with the first cup-shaped element at one temperature and to actuate, with a snap action, the arcuate members out of engagement with the first cup-shaped element at another temperature.

9. In combination, a pair of substantially aligned shafts having ends disposed adjacent each other, a clutching device having two mechanisms, one of which comprises a substantially cup-shaped element secured to the end of one of said shafts, the other of which comprises a substantially cup-shaped element disposed within the first cup-shaped element, including a base member secured to the adjacent end of the other shaft, arcuate members slidably mounted on said base member, linkage mechanisms pivotally secured to said base member and said arcuate members, a supporting flange secured to the said other shaft, and snap-acting bimetallic thermal responsive elements secured to the supporting flange and pivotally secured to the linkage mechanisms, said thermal responsive elements and said linkage mechanisms co-operating with said arcuate members to cause positive snap-acting engagement of said arcuate members with the first cup-shaped element for one temperature and to cause snap-acting disengagement of said arcuate members with the first cup-shaped element for another temperature.

JOHN G. WALZ.